(12) United States Patent
Paolino et al.

(10) Patent No.: US 11,669,620 B2
(45) Date of Patent: Jun. 6, 2023

(54) SYSTEM PLATFORM INITIALIZER FOR MIXED-CRITICAL SYSTEMS

(71) Applicant: VIRTUAL OPEN SYSTEMS, Grenoble (FR)

(72) Inventors: Michele Paolino, Grenoble (FR); Salvatore Daniel Raho, Grenoble (FR)

(73) Assignee: VIRTUAL OPEN SYSTEMS, Grenoble (FR)

( * ) Notice: Subject to any disclaimer, the term of this patent is extended or adjusted under 35 U.S.C. 154(b) by 37 days.

(21) Appl. No.: 17/247,480

(22) Filed: Dec. 12, 2020

(65) Prior Publication Data
US 2021/0182401 A1    Jun. 17, 2021

(30) Foreign Application Priority Data
Dec. 13, 2019  (EP) ..................... 19306648

(51) Int. Cl.
*G06F 21/57*    (2013.01)
*G06F 9/30*     (2018.01)
*G06F 9/4401*   (2018.01)
*G06F 21/53*    (2013.01)
*G06F 21/54*    (2013.01)

(52) U.S. Cl.
CPC ........ *G06F 21/575* (2013.01); *G06F 9/30101* (2013.01); *G06F 9/4411* (2013.01); *G06F 21/53* (2013.01); *G06F 21/54* (2013.01)

(58) Field of Classification Search
CPC ........ G06F 21/53; G06F 21/54; G06F 21/575; G06F 21/74; G06F 2221/2149; G06F 9/30101; G06F 9/4406; G06F 9/441; G06F 9/4411
See application file for complete search history.

(56) References Cited

U.S. PATENT DOCUMENTS

| | | | |
|---|---|---|---|
| 7,024,555 B2 * | 4/2006 | Kozuch ................. | G06F 21/57 713/168 |
| 7,502,674 B2 * | 3/2009 | Okude ................ | G06F 9/45558 701/1 |
| 7,921,293 B2 * | 4/2011 | Kozuch ................. | G06F 21/57 726/17 |
| 10,032,029 B2 * | 7/2018 | Kawano ................ | G06F 21/575 |
| 10,037,426 B2 * | 7/2018 | Francois ................ | G06F 21/57 |
| 10,146,940 B2 * | 12/2018 | Surdu .................... | G06F 9/441 |
| 10,339,307 B2 * | 7/2019 | Dabosville ............ | G06F 21/552 |
| 10,484,370 B2 * | 11/2019 | Wimböck ............... | H04L 67/12 |
| 10,684,865 B2 * | 6/2020 | Li ......................... | H04L 9/0894 |

(Continued)

FOREIGN PATENT DOCUMENTS

WO    2005031572 A2    4/2005

OTHER PUBLICATIONS

Search Query Report from IP.com (performed Jun. 17, 2022) (Year: 2022).*

(Continued)

*Primary Examiner* — Sharon S Lynch
(74) *Attorney, Agent, or Firm* — Moreno IP Law LLC

(57) ABSTRACT

The present disclosure relates to a computing architecture configured to run a first operating system (512) and an isolated operating system (520), wherein the computing architecture is configured to load and run the isolated operating system before loading and running the first operating system.

15 Claims, 9 Drawing Sheets

(56) References Cited

U.S. PATENT DOCUMENTS

| | | | | |
|---|---|---|---|---|
| 2012/0297177 | A1* | 11/2012 | Ghosh | G06F 21/575 |
| | | | | 713/2 |
| 2014/0337918 | A1* | 11/2014 | Siddiqi | G06F 21/572 |
| | | | | 726/25 |
| 2016/0012233 | A1* | 1/2016 | Kawano | G06F 21/575 |
| | | | | 713/165 |
| 2016/0124751 | A1* | 5/2016 | Li | G06F 21/74 |
| | | | | 713/100 |
| 2016/0125186 | A1* | 5/2016 | Francois | G06F 21/6218 |
| | | | | 726/1 |
| 2016/0335433 | A1* | 11/2016 | Dabosville | G06F 21/52 |
| 2018/0032733 | A1* | 2/2018 | Surdu | G06F 9/4418 |
| 2018/0241744 | A1* | 8/2018 | Wimböck | G06F 21/575 |
| 2018/0365421 | A9* | 12/2018 | Surdu | G06F 9/4418 |
| 2019/0278611 | A1* | 9/2019 | Li | H04L 9/0894 |
| 2020/0133876 | A1* | 4/2020 | Bielski | G06F 9/4411 |

OTHER PUBLICATIONS

Search Query Report from IP.com (performed Dec. 28, 2022) (Year: 2022).*

Extended European Search Report for European Application No. 20213466.4 dated Apr. 16, 2021, 12 pages.

K. Sun et al., "SecureSwitch: BIOS-Assisted Isolation and Switch between Trusted and Untrusted Commodity OSes", 19th Annual Network & Distributed System Security Symposium, Feb. 7, 2012, 15 pages.

Office Action for European Patent Application No. 20213466.4 dated Jan. 26, 2023, 7 pages.

* cited by examiner

SYSTEM PLATFORM INITIALIZER FOR MIXED-CRITICAL SYSTEMS

STATEMENT OF GOVERNMENT INTEREST

The work leading to this invention has received funding from the European Union Horizon 2020 Programme H2020/2014-2020 under the grant agreement 957269 (EVEREST).

FIELD

The present disclosure relates to the field of computers, and in particular to processors capable of entering secure operating modes.

BACKGROUND

For safety critical workloads, systems having secure environments have been proposed based on running a protected operating system or hypervisor.

However, a drawback of existing solutions is that the secure environment tends to be relatively slow to boot. Indeed, the system is first initialized by loading a standard operating system during a boot process, and then the protected operating system or hypervisor is run. However, for some applications it would be desirable to allow a secure mode to be entered quickly. Furthermore, in existing solutions, the secure mode is dependent on the non-safety critical operating system, and may not have priority for all safety-relevant decisions, such as power management.

SUMMARY

It is an aim of embodiments of the present disclosure to at least partially address one or more drawbacks in the prior art.

According to one aspect, there is provided a computing architecture configured to run a first operating system and an isolated operating system, wherein the computing architecture is configured to load and run the isolated operating system before loading and running the first operating system.

According to one embodiment, the computing architecture is configured to load and run the first operating system using a boot manager, the boot manager being launched after loading and running the isolated operating system using a further operating system loader.

According to one embodiment, the computing architecture further comprises a first memory space accessible by the first operating system, and a second memory space, wherein during loading of the isolated operating system, the computing architecture is configured to lock memory accesses to prevent future access to the second memory space by the first operating system.

According to one embodiment, the computing architecture comprises a plurality of processing cores, wherein one or more of the plurality of processor cores comprises a context switch configured to store the contents of one or more registers associated with the system management mode to the second memory space upon exiting the system management mode, the context switch also for example being configured to restore the contents of the one or more registers upon a subsequent return to the system management mode.

According to one embodiment, the computing architecture comprises a first memory management unit configured to manage access to the first memory space and a second memory management unit configured to manage access to the second memory space.

According to one embodiment, the first memory space stores a first system table, and the computing architecture is configured, during booting of the isolated operating system, to run a driver in order to:
  fill the first system table with one or more peripherals that are not safety-relevant;
  create a second system table; and
  fill the second system table with one or more safety-relevant peripherals, such that memory, registers and/or interrupts of safety-relevant peripherals are isolated from and non-accessible by the first operating system.

According to one embodiment, the isolated operating system is loaded and run in a system management mode, the computing architecture being configured to generate a system management interrupt for causing the system management mode to be entered before or during the loading of the isolated operating system.

According to one embodiment, the computing architecture is configured to give priority to the isolated operating system for decisions relating to hardware power management.

According to a further aspect, there is provided a computing system configured to control automotive functions in a vehicle, the computing system comprising the above computing architecture.

According to a further aspect, there is provided a computing system configured to implement heterogeneous distributed scalable and secure systems, comprising the above computing architecture.

According to a further aspect, there is provided a computing system configured to monitor and/or control one or more services in an urban environment, the computing system comprising the above computing architecture, wherein the isolated operating system is configured to run security workloads.

According to a further aspect, there is provided a method of booting a first operating system and an isolated operating system in a computing architecture, the method comprising:
  loading and running the isolated operating system; and
  after loading and running the isolated operating system, loading and running the first operating system.

According to one embodiment, the computer architecture comprises a first memory space accessible by the first operating system, and a second memory space, the method further comprising, during loading of the isolated operating system, locking memory accesses to prevent future access to the second memory space by the first operating system.

According to one embodiment, the first memory space stores a first system table, the method further comprising, during loading of the isolated operating system, running a driver in order:
  fill the first system table with one or more peripherals that are not safety-relevant;
  create a second system table; and
  fill the second system table with one or more safety-relevant peripherals, such that memory, registers and/or interrupts of safety-relevant peripherals are isolated from and non-accessible by the first operating system.

According to a further aspect, there is provided a non-transitory storage medium storing instructions that cause the above method to be implemented when executed by processing hardware.

Embodiments of the present disclosure provide, for example, the possibility to run a strongly isolated safety critical operating system together with a standard operating system, for example in an x86 platform, thereby addressing safety requirements (i.e., the safety workload run first and in an isolated manner).

According to one aspect, a new platform initializer firmware is provided that loads an operating system in the System Management Mode execution environment (in SMM mode) before booting the standard one (in real, virtual or protected mode).

The operating system running in the SMM execution environment is considered completely independent from the other OS, and has higher priority for safety-relevant decisions.

According to a further aspect, there is provided a boot loader configured to boot a safety/security critical operating system in the early stages of the platform initialization, before the standard operating system, creating at least one strongly isolated partition in the system, such as a CPU memory isolation, for instance using SMM. This strongly isolated partition is for example composed of a number of CPU cores, a private or protected memory, and a number of IO devices mapped to this private or protected memory.

In one embodiment, once the safety critical partition(s) is/are created and protected, the standard operating system is run in a transparent fashion, i.e., no modification of the standard OS is performed.

According to one aspect, there is provided a system having a processor, such as an x86 processor, with SMM, and which runs a safety critical OS in the SMM area, protecting it from the standard OS. The system for example includes a number of peripherals with specific safety requirements (e.g., CAN bus, etc.) that can be strongly isolated from the rest of the system. Such peripherals are for example allocated exclusively to the safety OS. The system also for example has a shared memory mechanism, built on a volatile memory area, such an area of random-access memory (RAM), that is accessible also from the safe operating system.

According to another aspect, there is provided a computing system comprising an x86 processor having a system management mode (SMM), and configured to run a safety critical OS in the system management mode, thereby protecting it from one or more further OS running in the computing system.

According to one embodiment, the computing system further comprises one or more peripherals with specific safety requirements, such as a CAN bus, the one or more peripherals being allocated exclusively to the safety critical OS.

According to one embodiment, the computing system has a shared memory mechanism, which is for example built on a RAM memory area, and that is accessible also from the safety critical operating system.

According to one embodiment, the computing system comprises at least one isolated partition formed of one or more CPU cores, one or more regions of access-restricted memory, and one or more input/output devices mapped in the one or more regions of access-restricted memory.

According to yet a further aspect, there is provided a secure partition in the above computing system, configured to run a safety critical operating system, with applications that provide, for example, power management, security service, wherein the safety critical operating system for example manages power management requests coming from a standard OS, and which for example provide details on the existing hardware to the safety critical operating system, thereby permitting, for example, one or more devices to be hidden from the standard OS.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

In the following disclosure, detailed embodiments are described based on an x86 system architecture. However, it will be apparent to those skilled in the art that the techniques described herein could be applied to a broad range of system architectures.

Furthermore, while in the present disclosure embodiments are described in the context of a UEFI system in which a DXE driver is used to implement certain features, it will be apparent to those skilled in the art that the principles described herein could be easily applied to non-UEFI environments.

Figure 1:
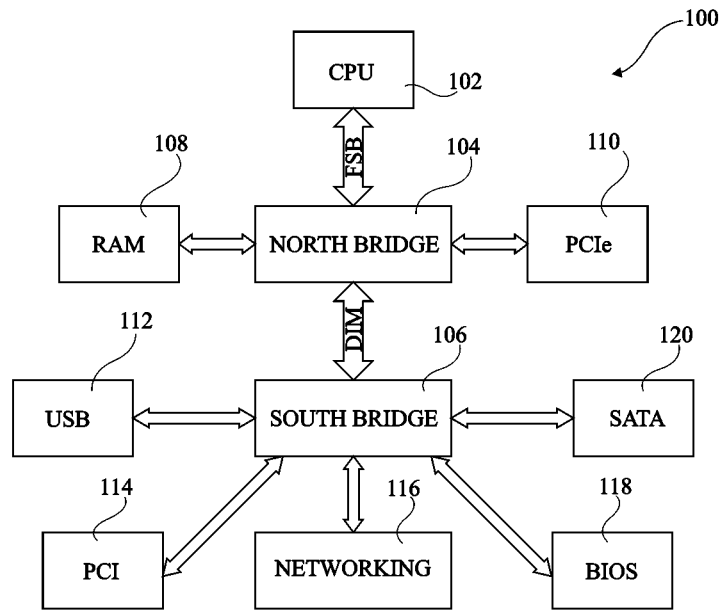
FIG. 1 schematically illustrates an example of an x86 system architecture.

FIG. 1 schematically illustrates an example of an x86 system architecture 100 comprising a central processing unit (CPU) 102, a northbridge (NORTHBRIDGE) 104 and a southbridge (SOUTHBRIDGE) 106.

For example, the northbridge 104 is coupled to the CPU 102 via a front side bus (FSB). The northbridge 104 is for example dedicated to high performance communications, and is coupled to peripheral devices such as a random-access memory (RAM) 108 and other devices via one or more PCIe (Peripheral Component Interconnect-express) interfaces 110.

The southbridge 106 is coupled to the northbridge 104 via a DMI (Direct Media Interface), and is for example dedicated to lower performance communications with further peripheral devices. FIG. 1 illustrates examples of such devices including a USB (Universal Serial Bus) interface 112, a PCI interface 114, a networking (NETWORKING) interface 116, a BIOS (basic input output system) 118, and a SATA (Serial Advanced Technology Attachment) interface 120.

Safety related peripherals, such as LIN (Local Interconnect Network) and CAN (Controller Area Network) automotive buses, or time-sensitive ethernet networking peripherals, do not generally require performance as high as RAM or PCIe, and consequently are usually connected to the southbridge.

While FIG. 1 illustrates an example having a northbridge 104 that is separate from the CPU 102, in some embodiments, the northbridge is integrated in the CPU, and in such a configuration the southbridge is generally referred to as a PCH (Platform Controller Hub).

The x86 architecture for example supports the System Management Mode (SMM) as one of its operating modes as will now be described with reference to FIG. 2.

Figure 2:
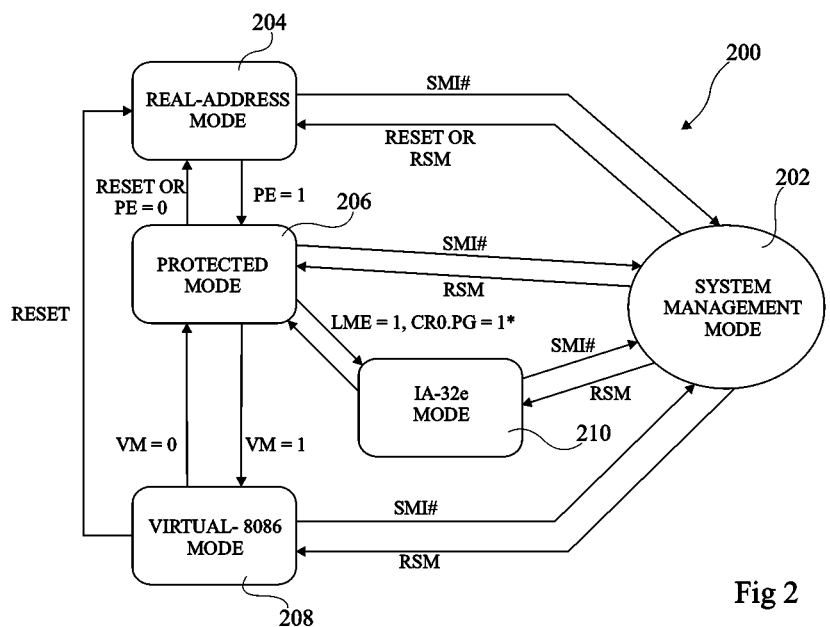
FIG. 2 is a state diagram illustrating an example of operating modes of the system of FIG. 1.

FIG. 2 is a state diagram 200 illustrating an example of operating modes of the system of FIG. 1.

The system management mode (SYSTEM MANAGEMENT MODE) 202, hereafter referred to as SMM, can for example be entered from one or more other modes of the system.

For example, the system has a real-address mode (REAL-ADDRESS MODE) 204, a protected mode (PROTECTED MODE) 206, a virtual mode (VIRTUAL-8086 MODE, the number 8086 corresponding to the reference of an Intel processor) 208 and an IA-32e mode (IA-32e MODE, for Intel Architecture 32 bit extended) 210. It is for example possible to enter the protected mode 206 from the real-address mode 204 by setting a PE bit to 1 in a CR0 register (not illustrated), and to return by setting this bit to 0 or via a reset (RESET OR PE=0). In the protected mode 206, additional features, such as virtual addressing, are for example supported. It is for example possible to enter the virtual mode 208 from the protected mode 206 by setting a bit VM to 1 in the EFLAGS register, and to return to the protected mode 206 by setting this bit to 0, or to return directly to the real-address mode 204 using a reset (RESET). It is also for example possible to enter the IA-32e mode 210 from the protected mode 206 by setting bits LME and PG in the CR0 register to 1, and while not illustrated in detail in FIG. 2, there is also a procedure for returning from the mode 210 to the protected mode 206.

The SMM 202 can for example be entered from each of the modes 204, 206, 208 and 210 by a System Management Interrupt (SMI) SMI #. At that point, the processor for example saves its state to a dedicated memory area and switches to the SMM. To return to the previous mode from the SMM, a return instruction RSM (Resume from System Management mode) is for example run from the SMM, which restores the saved processor state and resumes normal execution.

The processor state, as well as the SMM code, is stored in memory area called SMRAM. This area can be locked, preventing all access to it from outside SMM$. For instance, on Intel processors this can be done by setting D_OPEN and D_LCK bits of the SMRAMC register.

All interrupts, including non-maskable ones, are for example disabled upon entering the SMM. One or more of these interrupts can for example be enabled by the code running in SMM.

SMM is currently used mainly to run power management firmware and to store secure boot safety functions/data. It is proposed herein to use the SMM for safety critical workloads, in view of the following advantages that it provides:

a) SMM code and data are stored in a specific secure memory area (SMRAM) isolated from main memory;

b) Code running in the SMM domain is completely transparent from code running in the other domains, meaning that it is not visible, and therefore not accessible or readable from the other domains, and also that it is independent from the code running in other domains, because there is no way for that code to impact the SMM execution;

c) The codebase for a Trusted Computing Base and for certification is relatively low, for example a hypervisor is not requested;

d) SMM is entered by triggering an SMI interrupt, and if an SMI interrupt is triggered when the processor is already in SMM, it is latched and will be handled after the processor returns to the previous mode via the RSM instruction; and e) SMI is a non-maskable external interrupt that takes precedence over a non-maskable interrupt (NMI) and a maskable interrupt.

Figure 3:
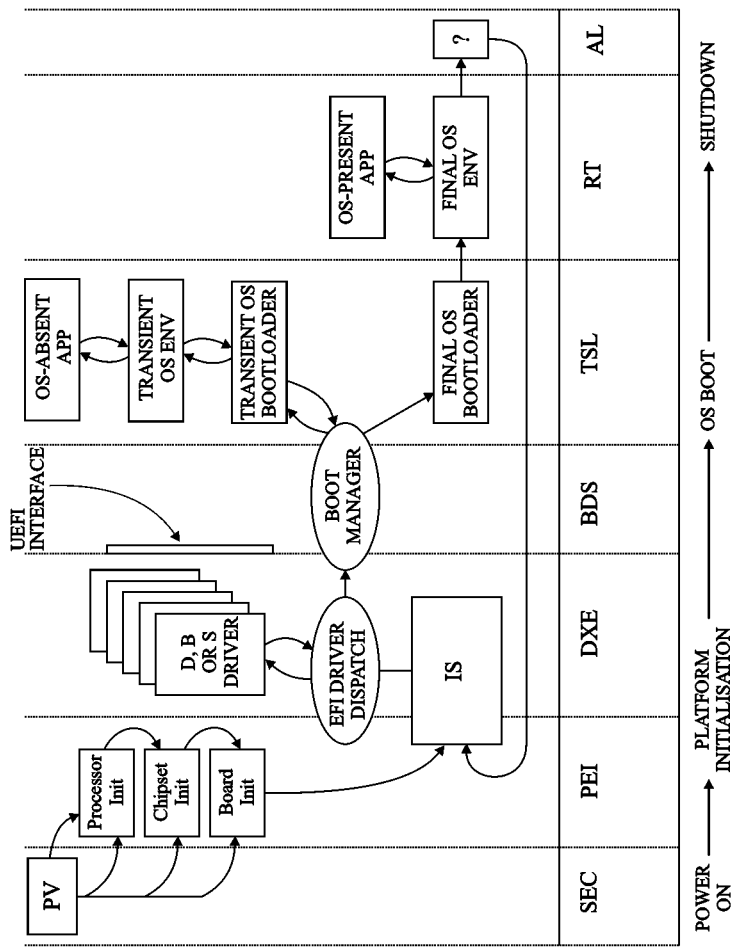
FIG. 3 represents an example of a boot process that can be applied to the x86 system architecture of FIG. 1.

FIG. 3 represents an example of a boot process that can be applied to the x86 system architecture 100 of FIG. 1.

The boot process of FIG. 3 is based on UEFI (Unified Extensible Firmware Interface), which is a specification defining the software interface between the operating system and the platform firmware. UEFI for example takes care of the low-level operating system interactions with the hardware interactions, including the early phase of the system boot. UEFI defines the series of steps shown in FIG. 3 to manage the whole life-cycle of a computing system, from power on (POWER ON), to platform initialization (PLATFORM INITIALISATION), to OS boot (OS BOOT) and then to shutdown (SHUTDOWN).

The boot process comprises seven phases, as will now be described in more detail.

Directly after power on, there is a security phase (SEC) during which a pre-verification is made by a pre-verifier code (PV). For example, this involves verifying the signatures of processor initialization code (Processor Init), chipset initialization code (Chipset Init), and board initialization code (Board Init).

After the SEC phase, there is for example a pre EFI initialization phase (PEI), during which the processor, chipset and board initialization codes are executed in series.

After the PEI phase, there is for example a driver execution environment phase (DXE), during which intrinsic services are for example loaded, and an EFI driver dispatcher is executed that loads device, bus and/or service drivers (D, B OR S DRIVER).

After the DXE phase, there is for example a boot device select phase (BDS), during which a boot manager component (BOOT MANAGER) is loaded, this component for example corresponding to code that is configured to boot the operating system after the BDS phase. There is a UEFI interface (UEFI INTERFACE) between the DXE and BDS phases, implying that once the boot manager is loaded in the system, the UEFI resources, such as code and data stored in memory, are for example freed in order to leave room for the operating system.

After the BDS phase, there is for example a transient system load phase (TSL). During the TSL phase, the OS boot for example involves running a transient OS bootloader (TRANSIENT OS BOOTLOADER), a transient OS environment (TRANSIENT OS ENV.) and an OS-absent app (OS-ABSENT APP). Furthermore, a final OS bootloader (FINAL OS BOOTLOADER) is also for example run during the TSL phase. During the TSL phase, the boot manager is for example configured to run the OS loader that customizes the OS boot depending on the description of the available hardware made available, in a table called the system table, by the previous UEFI phases. An example of such a system table is the ACPI (Advanced Configuration and Power Interface) differentiated system description table. Depending on the information included in the system table, such as the defined devices, I/O Ports, IRQs (Interrupt Requests), Memory Mappings, etc., the OS is configured to load the related system driver during a subsequent runtime (RT).

During the runtime, a final OS environment (FINAL OS ENV.) and an OS-present app (OS-PRESENT APP) are for example run.

If a shutdown command or event occurs during runtime, in an afterlife phase (AL), a reboot can be performed by in the case of a system restart. For example, this involves returning to the loading operation of the intrinsic services.

There are for example parts of the code/data, known as runtime drivers, that are loaded in UEFI that are kept also for later use. One example of such a runtime driver is the SMM, which is for example configured to install an SMM handler in the UEFI DXE phase, which is then used by applications running on top of the operating system, as will now be described with reference to FIG. 4.

Figure 4:
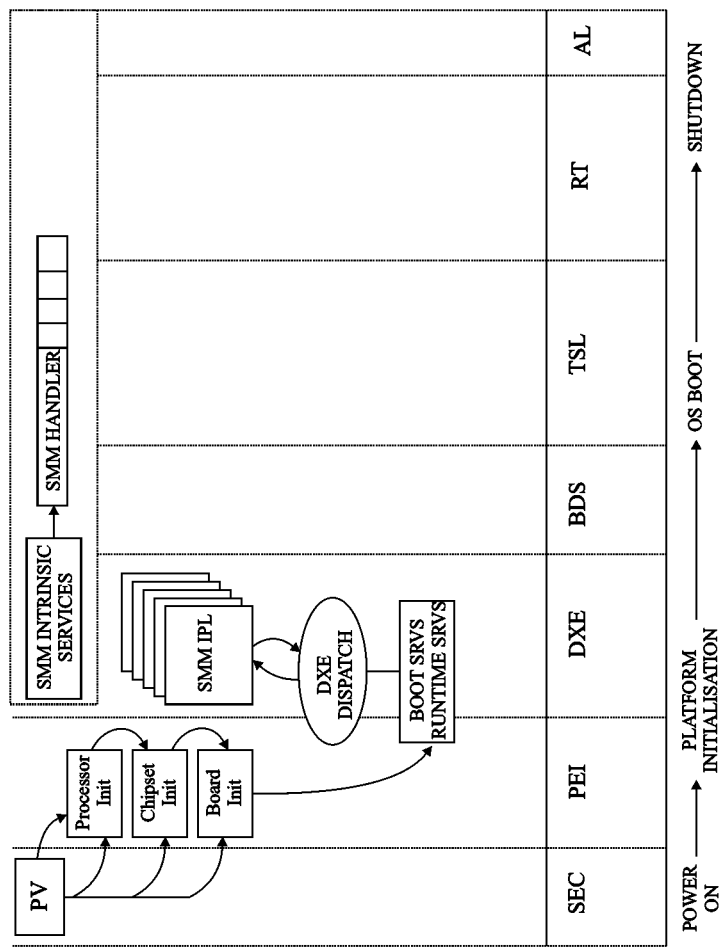
FIG. 4 represents an example of loading system management mode firmware.

FIG. 4 represents an example of loading SMM firmware. The boot phases of FIG. 4 are the same as those of FIG. 3, and will not be described again in detail. FIG. 4 represents an additional operation performed during the DXE phase involving, as part of the loading of the intrinsic services, the loading of boot services (BOOT SRVS) and of runtime services (RUNTIME SRVS), and via a DXE dispatcher (DXE DISPATCH) of the EFI driver dispatcher, the running of an SMM initial program loader (SMM IPL). As represented at the top of FIG. 4, from the DXE phase, SMM intrinsic services (SMM INTRINSIC SERVICES) are for example loaded, and an SMM handler (SMM HANDLER) is established, which is used to get services in a master-slave fashion during runtime.

The boot process represented in FIG. 4 permits the loading of an SMM handler that is capable of serving workloads running in the standard operating system.

According to embodiments of the present disclosure, it is proposed to use the SMM feature in order to load an isolated operating system, such as a fully-fledged safety critical operating system. For example, the isolated OS is loaded from SMM, and this OS can run concurrently with a standard OS, as will now be described in more detail with reference to FIGS. 5 to 9.

Figure 5:
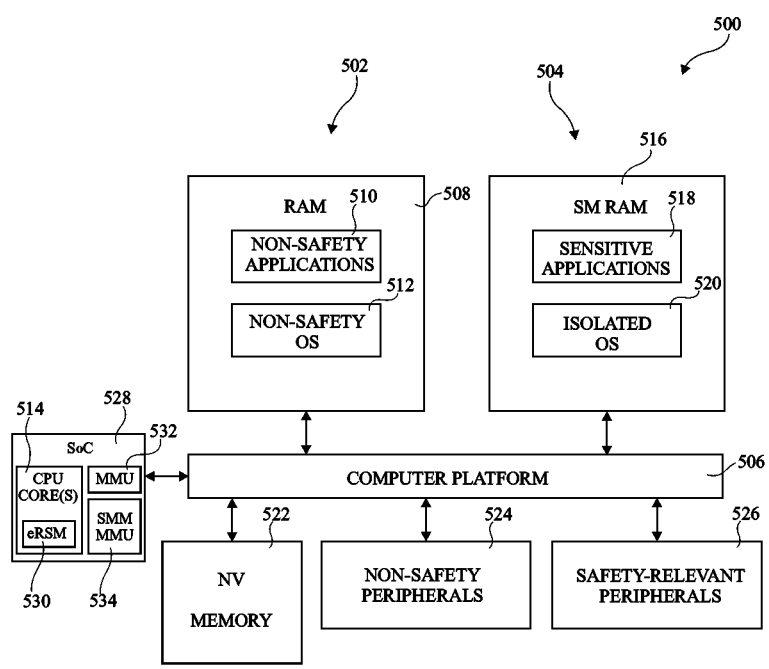
FIG. 5 schematically illustrates a system architecture according to an example embodiment of the present disclosure.

FIG. 5 schematically illustrates a system architecture 500 according to an example embodiment of the present disclosure.

The system architecture 500 comprises a non-SMM domain 502, and an SMM domain 504, linked by a computer platform (COMPUTER PLATFORM) 506, which is for example an x86 platform like the one described in relation with FIG. 1.

The non-SMM domain 502 for example comprises a memory space (RAM) 508, for example a RAM, storing non-safety applications (NON-SAFETY APPLICATIONS) 510, and storing code and data that support execution of a standard operating system (NON-SAFETY OS) 512, which is not safety critical, and will be referred to hereafter as a non-safety OS. This operating system is for example capable of running in some or all of real, virtual and protected modes. One or more CPU cores (CPU CORE(S)) 514 are for example allocated for running the non-SMM domain.

The SMM domain 504 for example comprises a memory space (SMRAM) 516, which is for example a protected RAM accessible only from the SMM domain 504. The memory space 508 is, on the contrary, accessible by both of the domains 502, 504. The memory spaces 508 and 516 are for example implemented by separate memory devices. Alternatively, these memory spaces 508, 516 could be implemented by one or more common memory devices, but registers associated with the memory space 516 for example allow this region of the memory to be locked against access from the non-SMM domain 502. The memory space 516 for example stores one or more sensitive applications (SENSITIVE APPLICATIONS) 518 corresponding to applications that may be safety critical, implying that their execution should be protected from unauthorized interference. Furthermore, the memory space 516 for example stores code and data supporting execution of a protected, or safety, operating system (ISOLATED OS) 520, which is for example an isolated operating system, implying that its operations are isolated from the non-safety OS 512. The OS 520 will be referred to hereafter as an isolated OS. This isolation is for example achieved at least in part by the use of the protected memory 516 for storing the code and date used to run this OS. One or more of the CPU cores 514 are for example allocated for running the SMM domain.

The computer platform 506 also for example permits the connection with a non-volatile memory (NV MEMORY) 522, which is for example a hard drive or FLASH memory, with one or more non-safety peripherals (NON-SAFETY PERIPHERALS) 524, and with one or more safety-relevant peripherals (SAFETY-RELEVANT PERIPHERALS) 526.

In some embodiments, the one or more CPU cores 514 are part of a system-on-chip (SoC) 528. Furthermore, in some embodiments, the one or more CPU cores 514 are configured to support an extended RSM context switch (eRSM) 530, described in more detail below. Furthermore, a memory management unit (MMU) 532 and an SMM MMU 534, also described in more detail below, are for example associated with the CPU cores 514, and for example form part of the SoC 528. However, it would also be possible to omit, in alternative embodiments, the context switch 530 and/or the SMM MMU 534.

The SMM domain 502 corresponds to a protected area that is for example used to run a safety critical real time operating system and/or a hypervisor. The solution of FIG. 5 provides the following advantages:

as will be described in more detail below, the booting of the SMM domain is not dependent on the boot time of the non-safety OS 512, and can therefore be relatively fast;

the isolated OS has no dependency from the non-safety OS 512, meaning that while the two may interact, they are independent from each other;

the isolated OS is for example capable of having priority concerning all safety-relevant decisions, such as decisions relating to power management. For example, the SMM operating system is capable of denying a shutdown request from the other operating system if there are safety constraints; and the isolated OS is protected in the memory space SMRAM, and thus the non-safety OS is unable to attack it.

A number of services are for example provided in SMM, such services for example being run as applications on top of the safety operating system.

For example, the isolated and non-safety operating systems are configured to communicate through a shared memory mechanism. This mechanism is based on the fact that the isolated OS can read the memory of the non-safety OS, while the opposite is not true. As a consequence, it is possible to set up a memory area assigned to the non-safety OS as a buffer for communication between the two entities.

Furthermore, the applications for example run legacy services. By legacy services, we refer to all the services that are generally run in SMM, such as power management, security for secure boot, etc.

Safety-relevant 10 peripherals, such as time critical Ethernet, CAN/Lin buses, etc., are for example memory mapped in SMRAM, such that they are protected from the non-safety operating system.

On top of this, the isolated operating system for example controls the description of the hardware, such as the ACPI (Advanced Configuration and Power Interface) tables or device tree database, used by the non-safety operating system. In this way, it is possible to dynamically plug and unplug devices to be shared. For example, requests can be made to the isolated OS to modify these tables, for example by moving a device from one table to the other.

The eRSM context switch 530 is for example configured to improve performance when leaving the SMM mode, as will now be described in more detail. When entering the SMM mode after an SMI, the current context is for example saved to the SMM memory space 516. However, without the context switch 530, or a specific software code solution, programs in SMM are stateless and start always from the same point. While a software solution for storing the SMM context is feasible, it would be slow.

The context switch 530 is a hardware solution, and is for example configured such that the current SMM context is saved to the SMM memory space 516 when exiting the SMM mode using the RSM command. An advantage of this context saving is that it helps with multitasking on the isolated OS side, and also helps with handling requests to save data in software before such a context switch. The context switch 530 is for example configured to implement, in hardware, a procedure whereby the SMM execution registers are automatically saved in the memory space 516 (SMRAM) before exiting the SMM mode. This is for example implemented by extending the instruction set of a standard implementation of the RSM instruction. An existing assembly instruction (RSM) is used to implement the context switch between SMM and the other operating modes. This assembly instruction is implemented using a microprogram formed of a group of microcode instructions. However, the existing assembly instruction does not cause the state to be saved when exiting the SMM mode. To extend the standard implementation, the microprogram is for example modified by either adding a new assembly instruction (eRSM), or by extending the existing assembly instruction, such that the context switch 530 is configured to automatically save one or more registers prior to leaving SMM, these registers for example including at least some of: Control Registers (CR0, CR2, CR3, etc.), General Purpose Registers (EAX, EBX, ECX, etc.), Exceptions Flags (EFLAGS), Stack registers (SS, DS, CS, GS, FS, etc.) but also possibly debug registers (DR0, DR1, DR2, DR3, etc.), Memory Type Range Registers (MTTRs), etc. In addition, the new or modified RSM instruction is also for example able to resume the execution of a program in SMM. The modification of an assembly instruction can be considered as a hardware solution given that it modifies the behavior of the CPU. Furthermore, the use of a new or modified assembly instruction enables the tasks of the context switching operation (saving each of the registers) to be performed at least partially in parallel, leading to high performance.

The SMM MMU 534 provides enhancement of the SMM memory space 516. The task of an MMU is to provide translation between virtual addresses used by the applications and physical memory addresses of the memory device. With a single MMU or without any MMU, the SMM memory space 516 is for example implemented as a single continuous area. This is a problem if multiple (isolated) applications or operating systems are to be run in the SMM. Moreover, the addressing region with a single MMU or without an MMU is for example limited to 4 GB, which limits the number of applications or operating systems that can be run on it. To address this issue, in some embodiments, in addition to a standard MMU 532, the specific SMM MMU 534 is for example added. Thus, while the standard MMU 532 continues to provide address translation for part of the memory space used by the non-safety operating system, the SMM MMU 534 provides address translation for a separate part of the memory space used by the isolated OS. The configuration of the two MMUs 532, 534 is such that there is not any conflict between the translations, i.e., two virtual addresses managed respectively by the MMU 532 and the MMU 534 will not address a same physical address, except for shared address space between the non-safety and isolated operating systems. The SMM MMU 534 is a hardware component that is dedicated to SMM only. This SMM MMU 534 for example provides:

memory over commitment, meaning that applications of the isolated OS see a bigger memory space than the actual physical memory space available, i.e., more than 4 GB;

the possibility to have multiple memory areas in the system, thereby providing higher flexibility. Indeed, devices may be mapped anywhere in memory and multiple memory areas are used to address them;

support of an isolated view of the memory, such that multiple safety-related processes in SMM can see different pieces of memory with no conflicts or security issues.

The system architecture 500 is for example used within a computing device for applications in which a level of isolation is required for certain operations. For example, in the automotive field, a system like the one of FIG. 5 could be employed to run a safety critical ASIL (Automotive Safety Integrity Level) certified RTOS (Real-Time Operating System) in the SMM, and an infotainment operating system as the non-safety operating system, e.g., Linux, running in the virtual, real, or protected mode.

As a further example, the system architecture 500 could be used as part of a smart cities edge infrastructure, in which security workloads, for example controlling traffic signaling or the like, are run in the SMM mode, and standard services are run using the non-safety OS in the virtual, real or protected mode.

As yet a further example, the system architecture 500 could be used as part of a heterogeneous distributed scalable and secure system. For example, the architecture could be used as part of a big data processing solution, wherein the isolated operating system is configured to handle sensitive data, such as personal user data. Examples of such a system are described in more detail in the US patent application published as US2020/0133876 in the name of the present applicant, the contents of which is hereby incorporated by reference.

Figure 6:
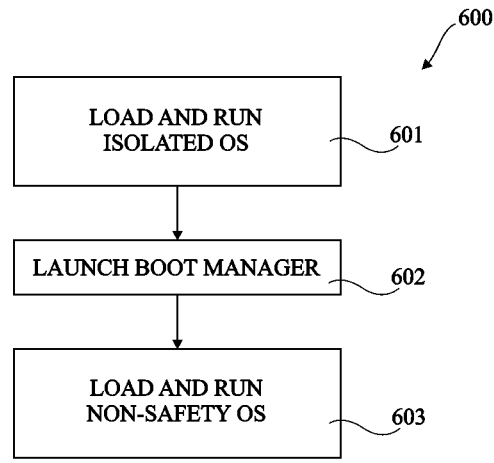
FIG. 6 is a flow diagram representing operations in a boot process of the architecture of FIG. 5 according to an example embodiment of the present disclosure.

FIG. 6 is a flow diagram representing operations in a boot process 600 of the architecture of FIG. 5 according to an example embodiment of the present disclosure.

In an operation 601, an isolated operating system is loaded and run in SMM, for example using the protected memory 516 of FIG. 5. As will be described in more detail below, this is for example achieved by modifying the platform initialization phase, such as the DXE phase, of the UEFI standard, to allow the isolated operating system to run in SMM before another non-safety, or standard, operating system.

In an operation 602, a boot manager is launched from the SMM in order to permit the non-safety operating system to be loaded.

In an operation 603, the non-safety OS is loaded and run.

Figure 7:
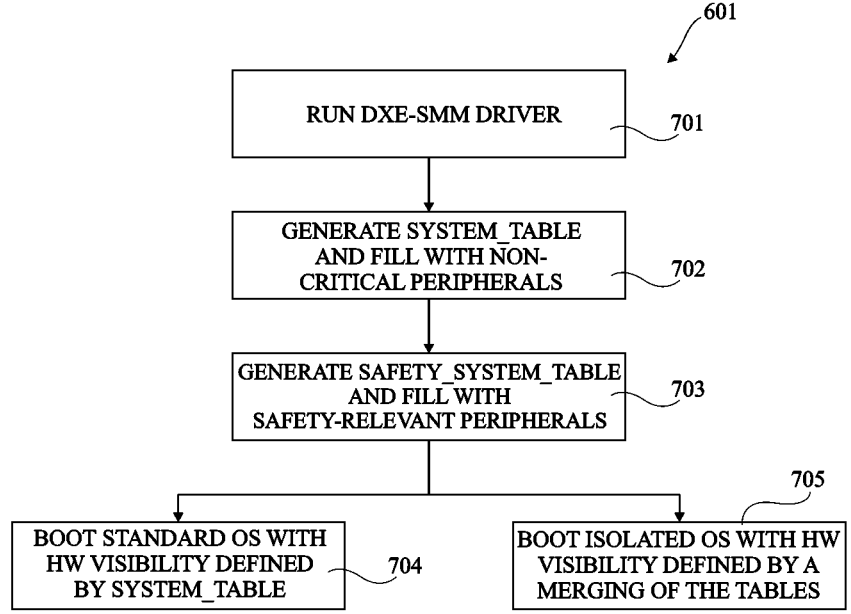
FIG. 7 is a flow diagram representing operations in a process of loading and running a protected operating system according to an example embodiment of the present disclosure.

FIG. 7 is a flow diagram representing in more detail the operation 601 of FIG. 6 of loading and running an isolated operating system.

In an operation 701, a dedicated driver, called herein a DXE_SMM driver, is for example loaded in order to configure the isolated OS in SMM. This driver is for example loaded during the DXE phase, and is for example configured to enable SMM, to initialize the protected memory, such as the SMRAM, to populate this memory with an SMM handler and with an SMM bootloader, and to lock this memory to prevent all accesses from outside of SMM.

In an operation 702, a non-safety OS system table, referred to hereafter as SYSTEM_TABLE, is for example generated and filled with the detected non-safety peripherals. This system table is for example stored in the memory space 508 of FIG. 5.

In an operation 703, an isolated OS system table, referred to hereafter as SAFETY_SYSTEM_TABLE, is generated and filled with safety-relevant peripherals. This system table is for example stored in the memory space 516 of FIG. 5.

In an operation 704, when the non-safety OS subsequently boots, its hardware visibility is for example defined by only the table SYSTEM_TABLE.

In an operation 705, which may occur in parallel with, before or after the operation 704, the isolated OS is booted with its hardware visibility defined for example by a merging of the two system tables SYSTEM_TABLE and SAFETY_SYSTEM_TABLE, such that it sees all of the peripherals of the system.

An advantage of generating separate system tables for non-critical peripherals and for safety-relevant peripherals is that the SMM layer can completely hide peripherals, memories and IO devices from the non-safety operating system. Indeed, in state of the art implementations, ACPI tables or a device tree database are used by the bootloader to manage peripherals. According to the embodiments described herein, the SMM is configured to modify/amend the description of the hardware used by the non-safety operating system that is to be booted.

While the tables SYSTEM_TABLE and SAFETY_SYSTEM_TABLE are for example ACPI tables, in alternative embodiments, different types of tables would be possible.

Figure 8:
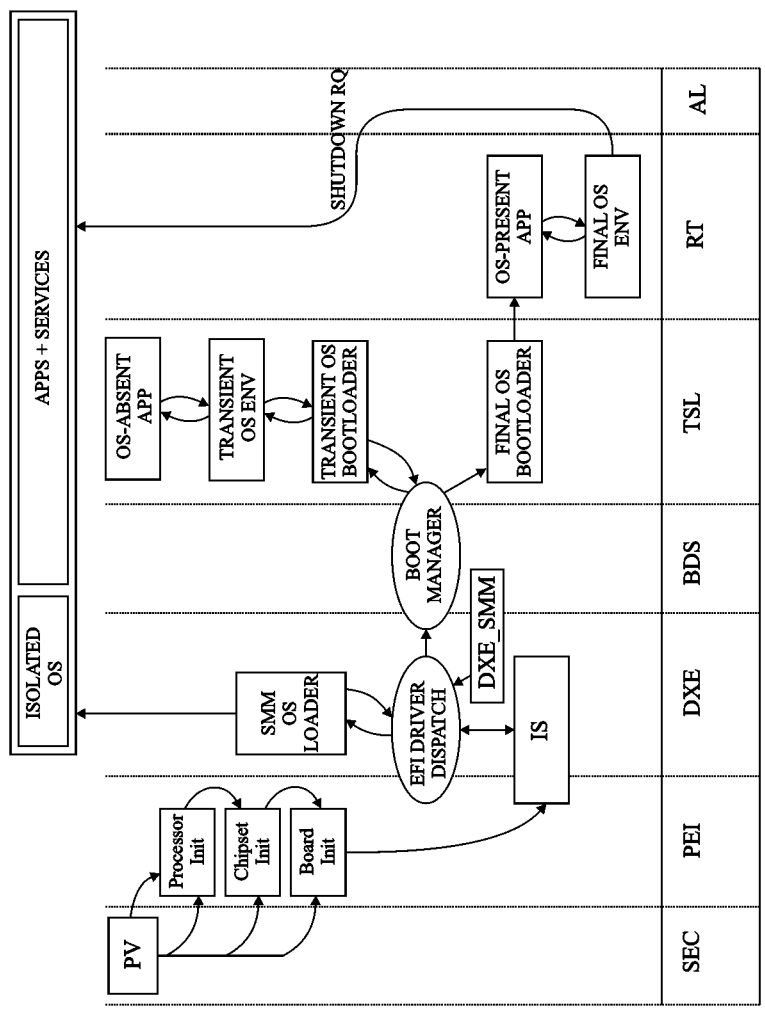
FIG. 8 represents an example of a boot process of the system architecture of FIG. 5 according to an example embodiment of the present disclosure.

FIG. 8 represents an example of a boot process of the system architecture of FIG. 5 according to an example embodiment of the present disclosure. In particular, FIG. 8 represents the booting of the isolated OS in SMM, based on the UEFI standard. The boot process thus has the same phases as the example of FIG. 3. However, the EFI driver dispatcher is for example configured to load the driver DXE_SMM that configures the SMM, and causes for example an SMM OS loader (SMM OS LOADER) to be launched in order to boot the isolated OS. Furthermore, if a shutdown request (SHUTDOWN RQ) is received during runtime, it is for example routed from the final OS environment to the isolated OS for handling.

Operations in a method of platform initialization, including the booting of an isolated and non-safety OS, will now be described in more detail with reference to FIGS. 9A to 9C.

Figure 9A:
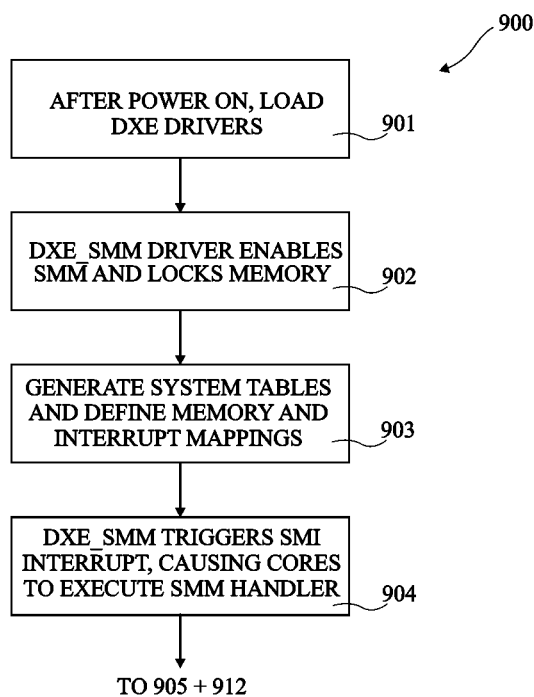
FIGS. 9A to 9C are flow diagrams illustrating operations in a platform initialization process according to an example embodiment of the present disclosure.
Figure 9B:
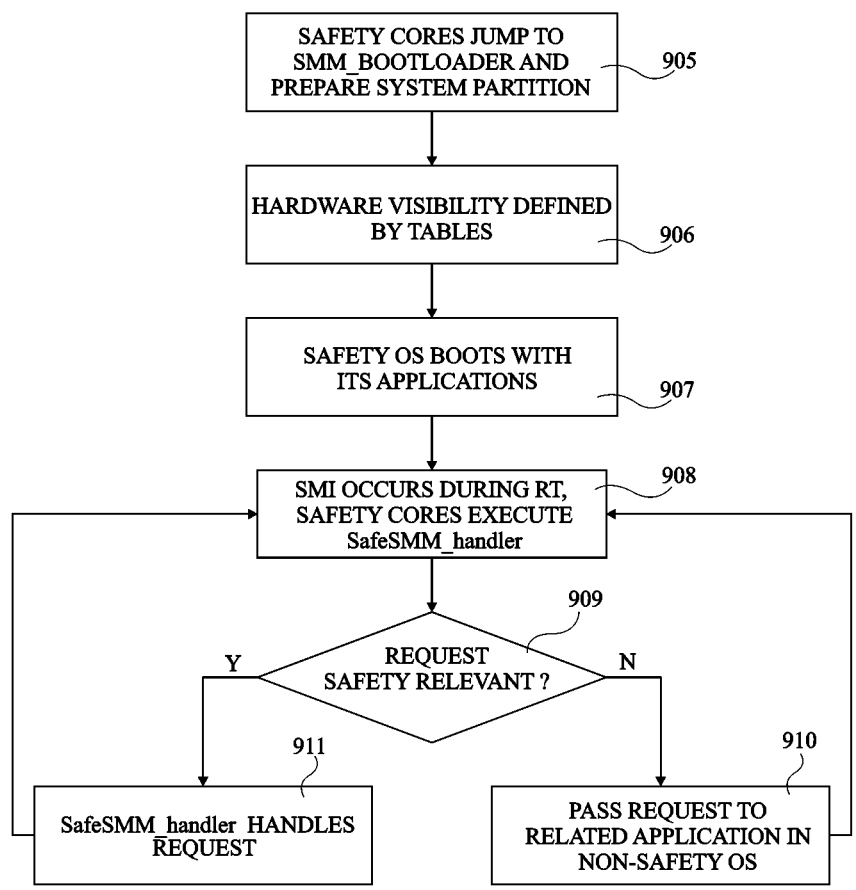
Figure 9C:
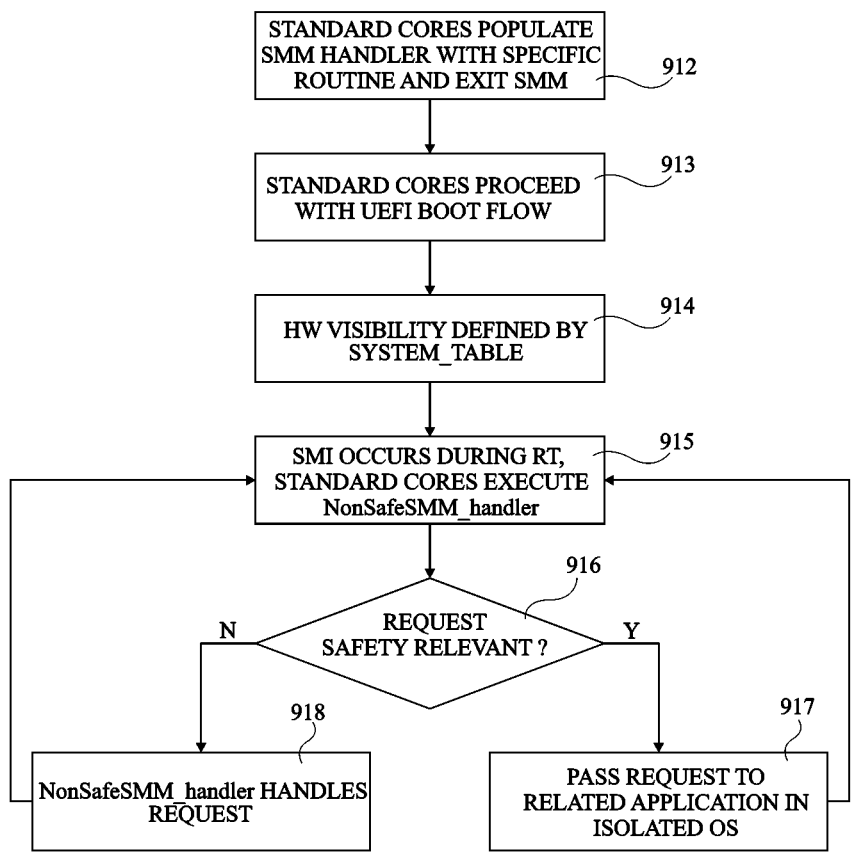

FIGS. 9A to 9C are flow diagrams illustrating operations in a platform initialization process 900 according to an example embodiment of the present disclosure. This process is for example performed by the system architecture of FIG. 5.

Referring first to FIG. 9A, in an operation 901, the system is powered on, for example by the user activating a push button or by another means, and the DXE drivers are loaded. For example, this involves first configuring the system by copying binary data from a non-volatile memory, such as a ROM (Read-Only Memory), to registers and/or to the RAM 508. Furthermore, in the case of a secure boot according to the UEFI standard, signatures are for example verified during the SEC and PEI phases. At this stage, a relatively small amount of RAM and a storage location are prepared for the DXE phase, and in particular for loading and executing the DXE core. The DXE core is a software component configured to load and manage the DXE drivers.

In an operation 902, the DXE_SMM driver is loaded, and this driver enables SMM and causes the memory to be locked. In some embodiments, the DXE_SMM driver is given priority over other drivers, for example by placing it at the top of the list of drivers, in order to speed up the availability of the isolated OS. For example, the DXE_SMM driver initializes the SMRAM memory, and populates it with an SMM handler, which will be called SafeSMM_Handler, and with an SMM bootloader, which will be called SMM_Bootloader. This SMM bootloader corresponds for example to the SMM OS LOADER of FIG. 8. The DXE_SMM driver then locks the SMRAM, preventing all accesses to it from outside SMM. For example, this is performed by setting D_OPEN and D_LCK bits of the SMRAMC register, as known by those skilled in the art.

In an operation 903, the system tables are generated, and memory and interrupt mappings are for example defined. For example, as described with reference to FIG. 7, the DXE_SMM driver fills the non-safety system table SYSTEM_TABLE with peripherals, except those that are safety-relevant. The safety system table SAFETY_SYSTEM_TABLE is created, indicating only the safety-relevant peripherals. By filling the safety system table, it is possible to isolate safety-relevant devices, including their memory, registers and interrupts, from the other devices of the non-safety system table. The southbridge or PCH is for example programmed at this stage to define memory and interrupt mappings for the safety-relevant peripherals, i.e., interrupts routed to the safety OS cores, and memory defined in the SMRAM.

In an operation 904, the DXI_SMM driver for example triggers an SMI interrupt, causing all cores to execute the handler SafeSMM_Handler. For example, this handler splits the workflow of the cores based on the processor APIC (Advanced Programmable Interrupt Controller) IDs, by reading the LOCAL APIC ID register using an RDMSR instruction. Some cores, which will be referred to as safety cores, are for example allocated to safety critical workloads using the isolated OS, and the remaining cores are for example allocated to the non-safety OS, and will be referred to as standard cores. Separate SMRAM areas are for example configured for each core by setting the SMBASE register of each core accordingly, as will be understood by those skilled in the art.

After operation 904, the safety OS for example boots by a process, an example of which is defined by operations 905 to 911 of FIG. 9B, and the non-safety OS for example boots by another process, an example of which is defined by operations 912 to 918 of FIG. 9C. These boot processes may be performed in any sequence or in parallel.

With reference to FIG. 9B, in the operation 905, the safety cores jump to the SMM_Bootloader described above, in order to prepare a system partition for use in booting the isolated OS. This is for example implemented by the SMM OS LOADER of FIG. 8.

In the operation 906, the hardware visibility of the isolated OS is defined by the SAFETY_SYSTEM_TABLE merged with the standard SYSTEM_TABLE, such that the isolated OS has full visibility of the system hardware.

In the operation 907, the safety OS boots with its applications, such as legacy services, power management, ACPI, etc.

In the operation 908, an SMI interrupt occurs during runtime, causing the standard cores to execute the specific handler SafeSMM_handler. For instance, the SMM is triggered by ACPI requests, by user interaction, or by system peripherals.

In the operation 909, it is determined whether the request is safety-relevant. An example of a safety-relevant request is for example a system shutdown request. For example, a list of safety-relevant requests is defined by the system tables, and checked by the handler SafeSMM_handler.

If the request is not safety-relevant, in the operation 910, the request is passed to the related application running in the non-safety OS. For example, the SafeSMM_handler shares the request with the related application via a shared memory mechanism. This application is then able to decide to accept, reject or partially execute the request.

If in operation 909 the request is safety-relevant, in the operation 911, the SafeSMM_handler for example handles the request.

After operations 910 and 911, the process for example returns to the operation 908 upon the occurrence of another SMI.

With reference now to FIG. 9C, in the operation 912, the standard cores for example populate their SMM handler and then exit SMM. For example, the standard cores populate their SMM handler with a specific handling routine, which will be called NonSafeSMM_handler, and then return from the SMM by executing an RSM instruction. In this way, the standard cores are available to complete the boot process and to run the non-safety OS.

In the operation 913, the standard cores proceed with the boot flow, which is for example a boot flow according to the UEFI standard, by loading and running the remaining DXE drivers, and then proceeding through the OS boot.

In the operation 914, the OS boot is complete, and the hardware visibility of the non-safety OS is defined by the non-safety system table, which does not include the safety-relevant devices.

In the operation 915, an SMI interrupt occurs during runtime, causing the standard cores to execute the specific handler NonSafeSMM_handler. For instance, the SMM is triggered by ACPI requests, by user interaction, or by system peripherals.

In the operation 916, it is determined whether the request is safety-relevant, like in the operation 909 of FIG. 9B.

If the request is safety-relevant, in the operation 917, the request is passed to the related application running in the isolated OS. For example, the NonSafeSMM_handler shares the request with the related application via a shared memory mechanism. This application is then able to decide to accept, reject or partially execute the request.

If in operation 916 the request is not safety-relevant, in the operation 917, the NonSafeSMM_handler for example handles the request.

After operations 917 and 918, the process for example returns to the operation 915 upon the occurrence of another SMI.

Various embodiments and variants have been described. Those skilled in the art will understand that certain features of these embodiments can be combined and other variants will readily occur to those skilled in the art.

What is claimed is:

1. A computing architecture configured to run a first operating system and an isolated operating system, the computing architecture comprising a first memory space in a non-system management mode (SMM) domain accessible by the first operating system, and a second memory space in a SMM domain, wherein:

the computing architecture is configured to load and run the isolated operating system in the second memory space before loading the first operating system in the first memory space and running the first operating system concurrently with the isolated operating system, wherein the isolated operating system is authorized to operate in any of a plurality of modes including the SMM while the first operating system is unable to operate in the SMM; and during loading of the isolated operating system, the computing architecture is configured to lock memory accesses to prevent future access to the second memory space by the first operating system.

2. The computing architecture of claim 1, wherein the computing architecture is configured to load and run the first operating system using a boot manager, the boot manager being launched after loading and running the isolated operating system using a further operating system loader.

3. The computing architecture of claim 1, wherein the computing architecture is configured to run the isolated operating system in the system management mode, wherein the computing architecture further comprises a plurality of processing cores, one or more of the plurality of processing cores comprising a context switch configured to store the contents of one or more registers associated with the system management mode to the second memory space upon the isolated operating system exiting the system management mode, the context switch also being configured to restore the contents of the one or more registers upon a subsequent return to the system management mode.

4. The computing architecture of claim 1, comprising a first memory management unit configured to manage access to the first memory space and a second memory management unit configured to manage access to the second memory space.

5. The computing architecture of claim 1, wherein the first memory space stores a first system table, and wherein the computing architecture is configured, during booting of the isolated operating system, to run a driver in order to:
fill the first system table with one or more peripherals that are not safety-relevant;
create a second system table; and
fill the second system table with one or more safety-relevant peripherals, such that memory, registers and/or interrupts of safety-relevant peripherals are isolated from and non-accessible by the first operating system.

6. The computing architecture of claim 1, wherein the isolated operating system is loaded and run in a system management mode, the computing architecture being configured to generate a system management interrupt for causing the system management mode to be entered before or during the loading of the isolated operating system.

7. The computing architecture of claim 1, configured to give priority to the isolated operating system for decisions relating to hardware power management.

8. A computing system comprising a computer architecture configured to run a first operating system and an isolated operating system, the computing architecture comprising a first memory space in a non-system management mode (SMM) domain accessible by the first operating system, and a second memory space in a SMM domain, wherein:
the computing architecture is configured to load and run the isolated operating system in the second memory space before loading the first operating system in the first memory space and running the first operating system concurrently with the isolated operating system, wherein the isolated operating system is authorized to operate in any of a plurality of modes including the SMM while the first operating system is unable to operate in the SMM; and
during loading of the isolated operating system, the computing architecture is configured to lock memory accesses to prevent future access to the second memory space by the first operating system.

9. The computing system of claim 8, configured to implement a heterogeneous distributed scalable and secure system.

10. The computing system of claim 8, configured to monitor and/or control one or more services in an urban environment, wherein the isolated operating system is configured to run security workloads.

11. A method of booting a first operating system and an isolated operating system in a computing architecture, the computing architecture comprising a first memory space in a non-system management mode (SMM) domain accessible by the first operating system, and a second memory space in a SMM domain, the method comprising:
loading and running the isolated operating system in the second memory space; and
after loading and running the isolated operating system, loading the first operating system in the first memory space and running the first operating system concurrently with the isolated operating system,
wherein the isolated operating system is authorized to operate in any of a plurality of modes including the SMM while the first operating system is unable to operate in the SMM, and
wherein during loading of the isolated operating system, the computing architecture is configured to lock memory accesses to prevent future access to the second memory space by the first operating system.

12. The method of claim 11, wherein the computer architecture comprises a first memory space accessible by the first operating system, and a second memory space, the method further comprising, during loading of the isolated operating system, locking memory accesses to prevent future access to the second memory space by the first operating system.

13. The method of claim 12, wherein the first memory space stores a first system table, the method further comprising, during loading of the isolated operating system, running a driver in order:
fill the first system table with one or more peripherals that are not safety-relevant;
create a second system table; and
fill the second system table with one or more safety-relevant peripherals, such that memory, registers and/or interrupts of safety-relevant peripherals are isolated from and non-accessible by the first operating system.

14. A non-transitory storage medium storing instructions that cause a method to be implemented when executed by processing hardware, the method comprising:
booting a first operating system and an isolated operating system in a computing architecture, the computing architecture comprising a first memory space in a non-system management mode (SMM) domain accessible by the first operating system, and a second memory space in a SMM domain, the method further comprising:
loading and running the isolated operating system in the second memory space; and
after loading and running the isolated operating system, loading the first operating system in the first memory space and running the first operating system concurrently with the isolated operating system,
wherein the isolated operating system is authorized to operate in any of a plurality of modes including the SMM while the first operating system is unable to operate in the SMM, and
wherein during loading of the isolated operating system, the computing architecture is configured to lock memory accesses to prevent future access to the second memory space by the first operating system.

15. The computing system of claim 8, configured to control automotive functions in a vehicle.

* * * * *